(12) United States Patent
Knepp et al.

(10) Patent No.: US 12,221,181 B2
(45) Date of Patent: Feb. 11, 2025

(54) TUGGER CART SYSTEM WITH AUTOMATED LIFTING AND STEERING

(71) Applicant: J-tec Industries, Inc., East Peoria, IL (US)

(72) Inventors: Joseph Knepp, Morton, IL (US); Ryan Merritt, Mapelton, IL (US); Ryan Smock, Morton, IL (US); Nicholas Kaiser, Morton, IL (US); Christopher Camp, Morton, IL (US)

(73) Assignee: J-TEC INDUSTRIES, INC., East Peoria, IL (US)

( * ) Notice: Subject to any disclaimer, the term of this patent is extended or adjusted under 35 U.S.C. 154(b) by 592 days.

(21) Appl. No.: 17/579,089

(22) Filed: Jan. 19, 2022

(65) Prior Publication Data

US 2023/0227088 A1 Jul. 20, 2023

(51) Int. Cl.
*B62D 57/032* (2006.01)
*B62B 5/00* (2006.01)

(52) U.S. Cl.
CPC .......... *B62D 57/032* (2013.01); *B62B 5/0036* (2013.01); *B62B 5/0069* (2013.01)

(58) Field of Classification Search
CPC .................................................. B62D 57/032
See application file for complete search history.

(56) References Cited

U.S. PATENT DOCUMENTS

| 9,676,314 | B2 | 6/2017 | Neubauer |
| 10,246,130 | B2 | 4/2019 | Bruns et al. |
| 10,315,714 | B2 | 6/2019 | Epperson |
| 10,775,805 | B2 | 9/2020 | Thode |
| 11,214,439 | B2 | 1/2022 | Knepp et al. |
| 11,273,857 | B2 * | 3/2022 | Knepp ................. B62D 53/005 |
| 11,285,984 | B2 * | 3/2022 | Scarth ................. B62D 53/005 |
| 2017/0197657 | A9 * | 7/2017 | Bruns ................. B62D 13/005 |
| 2018/0170468 | A1 | 6/2018 | Berghammer |
| 2020/0130759 | A1 | 4/2020 | Berghammer |
| 2020/0223468 | A1 | 7/2020 | Azumi |

(Continued)

FOREIGN PATENT DOCUMENTS

| CN | 105800511 A | 7/2016 |
| CN | 105314342 A | 12/2017 |
| CN | 108557404 A | 9/2018 |

(Continued)

*Primary Examiner* — Kevin Hurley
(74) *Attorney, Agent, or Firm* — Kilyk & Bowersox, PL.L.C.

(57) ABSTRACT

A tugger cart system used in an industrial setting, including a tugger cart and a controller. The tugger cart includes a tugger frame, a bay that is dimensioned to receive a rider cart, a platform configured to secure a rider cart within the bay, and at least one motor that pivots a plurality of wheels from side to side to steer the plurality of wheels. The tugger frame further includes a connector bracket that pivots from side to side along a vertical axis. The connector bracket is configured to attach the tugger frame to an adjacent tugger cart or tugger truck. A sensor system senses a degree that the connector bracket is pivoted relative to the tugger frame and generates an electronic signal. The controller receives the electronic signal from the sensor system and controls the motor to steer the plurality of wheels based on the electronic signal.

20 Claims, 9 Drawing Sheets

(56) References Cited

U.S. PATENT DOCUMENTS

2021/0276603 A1  9/2021  Knepp et al.

FOREIGN PATENT DOCUMENTS

| CN | 210363529 U     | 4/2020  |
|----|-----------------|---------|
| DE | 102010033677 A1 | 2/2012  |
| DE | 202012002489 U1 | 3/2012  |
| DE | 102011080857 A1 | 6/2012  |
| DE | 202015104832 U1 | 11/2015 |
| DE | 102014000887 B4 | 11/2019 |
| DE | 102018210180 A1 | 12/2019 |
| DE | 102019104046 A1 | 8/2020  |
| EP |      2161182 B1 | 6/2011  |
| EP |      3040235 A1 | 7/2016  |
| EP |      2492173 B1 | 11/2016 |
| EP |      2848503 B1 | 8/2018  |
| EP |      3699067 A1 | 8/2020  |
| WO |   2020089170 A1 | 5/2020  |

\* cited by examiner

TUGGER CART SYSTEM WITH AUTOMATED LIFTING AND STEERING

FIELD OF THE INVENTION

The present invention relates to transporting materials. The present invention also relates to transporting materials in an industrial building using tugger and rider cart systems.

BACKGROUND OF THE INVENTION

A tugger and rider cart system is commonly used to convey materials from one location to another location in a warehouse, a plant, a factory, a facility, or other type of large industrial building. The tugger and rider cart system typically includes three components: a tugger truck; tugger cart; and rider cart. The tugger truck pulls a train of tugger carts, with rider carts on board, from location to location in the industrial building. For example, the rider carts are loaded with material at a pick-up location. The rider carts are then loaded on to the tugger carts. After that, the rider carts are tugged to a drop-off location, unloaded off of the tugger carts, and pushed to their final position, where the materials are removed from the rider carts. At this point, the empty tugger carts can be reloaded with empty rider carts and returned to the pick-up location.

Many current tugger and rider cart systems rely on an operator to manually push rider carts onto the tugger carts when loading, and pulling rider carts off of tugger carts when unloading. Manually loading and unloading rider carts from tugger carts requires a high exertion of effort. When exerting such effort, the operator could over exert themselves, which results in fatigue and potential injury. Accordingly, manual loading and unloading of rider carts from tugger carts decreases workplace safety.

Additionally, hallways and aisles within industrial buildings are typically narrow so that space within the industrial buildings is used efficiently. Current tugger carts of tugger and rider cart systems utilize casters to roll on the floors of the industrial buildings. The casters of the tugger carts naturally pivot and turn when the tugger cart or tugger truck directly ahead of them is leading the tugger cart in a different direction. Thus, the steering of the tugger carts is delayed and it can be difficult for tugger carts to steer around narrow turns, especially when utilizing longer trains of tugger carts. As a result, tugger carts can run into aisles or walls when making sharp turns, causing damage in the industrial buildings.

SUMMARY OF THE INVENTION

A feature of the present invention is to provide a tugger cart or a train of tugger carts for transporting rider carts in an industrial setting.

Another feature of the present invention is to provide a tugger cart or a train of tugger carts that are easy to use in an industrial setting.

A further feature of the present invention is to provide a tugger cart or a train of tugger carts that are each configured to receive respective rider carts, the tugger cart(s) configured to automatically lift the respective rider carts to an elevated position.

An additional feature of the present invention is to provide a tugger cart or a train of tugger carts that receive respective rider carts, the tugger cart(s) configured to automatically lift the respective rider carts to an elevated position upon a first activation and automatically lower the respective rider carts upon a second activation.

Another feature of the present invention is to provide a tugger cart or a train of tugger carts capable of transporting respective rider carts, the tugger cart(s) having improved steering capabilities.

An additional feature of the present invention is to provide a tugger cart or a train of tugger carts capable of transporting respective rider carts, the tugger cart(s) and a controller capable of communicating with one another to enable improved steering.

A further feature of the present invention is to provide a train of tugger carts, each of the tugger carts capable of transporting a respective rider cart, each of the tugger carts having a respective sensor system to sense a steering of the respective tugger cart, the sensed steering being communicated with a controller, and the controller controlling the steering of the tugger carts to enable improved steering of the train of tugger carts.

Additional features and advantages of the present invention will be set-forth in part in the description that follows, and in part will be apparent from the description, or may be learned by practice of the present invention. The objectives and other advantages of the present invention will be realized and attained by means of the elements and combinations particularly pointed out in the description and appended claims.

To achieve these and other advantages, and in accordance with the purposes of the present invention, as embodied and broadly described herein, the present invention relates to a tugger cart system that can be used with a rider cart in an industrial setting. The tugger cart system includes a tugger cart. The tugger cart has a tugger frame having a front member, a rear member, a transverse member connecting the front member to the rear member, and at least one bay defined by the front member and the rear member, the at least one bay being dimensioned to receive a rider cart. The tugger cart further includes at least one platform configured to secure a rider cart within the at least one bay of the tugger frame, a plurality of wheels operatively coupled to the tugger frame, and at least one motor that pivots the plurality of wheels from side to side to steer the plurality of wheels. At least one connector bracket is coupled to the tugger frame at a pivot point such that the at least one connector bracket pivots relative to the tugger frame from side to side along a vertical axis. The at least one connector bracket is configured to attach the tugger frame to an adjacent tugger cart or tugger truck. At least one sensor system senses a degree that the at least one connector bracket is pivoted relative to the tugger frame and generates an electronic signal that includes the degree of pivot. The tugger cart system further includes a controller. The controller is configured to receive the electronic signal from the at least one sensor system and control the at least one motor to steer the plurality of wheels based on the electronic signal.

The plurality of wheels can include a front pair of wheels operatively coupled to the front member and a rear pair of wheels operatively coupled to the rear member. A front tie rod can be operatively connected to the front pair of wheels and operatively connected to a front motor such that the front motor shifts the front tie rod to steer the front pair of wheels. A rear tie rod can be operatively connected to the rear pair of wheels and operatively connected to a rear motor such that the rear motor shifts the rear tie rod to steer the rear pair of wheels. The front motor and the rear motor can operate independently of one another.

The sensor system can include a transmitter and a receiver. One of the transmitter and the receiver is coupled to the tugger frame, and the other of the transmitter and the receiver is coupled to the at least one connector bracket. The controller determines a direction of steering, a rate of steering, and a degree of steering based on the electronic signal and controls the at least one motor to steer the plurality wheels at the determined direction of steering, the determined rate of steering, and the determined degree of steering.

The tugger cart can further include a front connector bracket pivotably connected to the front member and a rear connector bracket pivotably connected to the rear member. The tugger cart can further include a front sensor system that senses a degree that the front connector bracket pivots relative to the tugger frame and a rear sensor system that senses a degree that the rear connector bracket pivots relative to the tugger frame. Each of the front sensor system and the rear sensor system can generate electronic signals that are received by the controller.

The tugger frame can further include a central member disposed in between the front member and the rear member. The central member is coupled to the transverse member. In such embodiments, the tugger cart includes a first bay defined by the front member and the central member, and a second bay defined by the central member and the rear member. Further, the at least one platform can include a first platform configured to secure a first rider cart within the first bay of the tugger frame, and a second platform configured to secure a second rider cart within the second bay of the tugger frame.

The tugger cart can further include at least one automated lift assembly coupled to the tugger frame. The at least one automated lift assembly is configured to raise the platform relative to the tugger frame upon a first activation, and lower the platform relative to the tugger frame upon a second activation. The at least one automated lift assembly can include an actuator having a piston configured to extend and retract in a horizontal direction, an actuator bracket coupled to the piston and configured to move with the piston in the horizontal direction, a sliding frame fixedly coupled to the at least one platform and slidably coupled to the tugger frame such that the sliding frame slides vertically relative to the tugger frame, and at least a first pair of link arms including a first link arm having a first end pivotably coupled to the tugger frame and a second end pivotably coupled to the actuator bracket and a second link arm having a first end pivotably coupled to the sliding frame and a second end pivotably coupled to the actuator bracket. When the at least one automated lift assembly is activated to raise the platform, the piston extends in the horizontal direction such that the actuator bracket pivots the first pair of link arms to an extended position that lifts the sliding frame relative to the tugger frame, and thereby lifts the platform to an elevated position. When the at least one automated lift assembly is activated to lower the platform, the piston retracts in the horizontal direction such that the actuator bracket pivots the first pair of link arms to a retracted position that lowers the sliding frame relative to the tugger frame, and thereby lowers the platform from the elevated position.

The automated lift assembly can further include a second pair of link arms. The second pair of link arms includes a third link arm having a first end pivotably coupled to the tugger frame and a second end pivotably coupled to the actuator bracket, and a fourth link arm having a first end pivotably coupled to the sliding frame and a second end pivotably coupled to the actuator bracket. The second pair of link arms are coupled at an opposite end of the actuator bracket relative to the first pair of link arms.

When the transport cart includes a single bay, the at least one automated lift assembly can include a first automated lift assembly coupled to the front member and a second automated lift assembly coupled to the rear member, the first and second automated lift assemblies being coupled to the platform.

When the transport cart includes a first and second bay, the at least one automated lift assembly can include a first automated lift assembly coupled to the front member and a second automated lift assembly coupled to the central member, the first and second automated lift assemblies being coupled to the first platform. A third automated lift assembly is coupled to the central member and a fourth automated lift assembly is coupled to the rear member, the third and fourth automated lift assemblies being coupled to the second platform.

The tugger cart can connect with other tugger carts using tongues, that have a ball and hitch connector or other type of connector. At least one tongue can be pivotably coupled to the connector bracket along a horizontal axis at a second pivot point. The at least one tongue pivots upward to be disposed in a vertical direction in a stowed position and pivots downward to be disposed in a horizontal direction in a deployed position where it is configured to connect with an adjacent tugger cart, tugger truck, or a hitch control.

The tugger cart can further include connecting interfaces for electrically connecting the tugger carts together in order for the tugger carts to communicate with the controller and for the controller to communicate with all of the tugger carts that are part of a train of tugger carts. A front connection interface can be disposed at the front member and a rear connection interface can be disposed at the rear member. The front connection interface and the rear connection interface are electrically connected to the at least one motor, the at least one sensor system, actuators of the automated lift assemblies, and the controller.

The controller of the present invention can be part of a hitch control. The hitch control includes the controller and a user interface for the controller. The hitch control is releasably connected to the front connection interface to communicate with the at least one motor, actuators of the automated lift assemblies, and the at least one sensor system.

The present invention can include a plurality of tugger carts including at least a first tugger cart and a second tugger cart. The first tugger cart and the second tugger cart can each have essentially the same components as one another that are described above. The front connection interface of the first tugger cart can be connected to the hitch control. The rear connection interface of the first tugger cart can be connected with the front connection interface of the second tugger cart. The connector bracket of the second tugger cart is connected to the connector bracket of the first tugger cart by a connection link that can be a tongue or other type of connector. The controller of the hitch control receives electronic signals from the at least one sensor system of the first tugger cart and from the at least one second sensor system of the second tugger cart, and controls the at least one motor of the first tugger cart and the at least one second motor of the second tugger cart, independently, to steer the plurality of wheels of the first tugger cart and the second plurality of wheels of the second tugger cart, based on the electronic signals.

It is to be understood that both the foregoing general description and the following detailed description are exemplary and explanatory only and intended to provide a further explanation of the present invention, as claimed.

BRIEF DESCRIPTION OF THE DRAWINGS

The invention may be more fully understood with reference to the accompanying drawings. The drawings are intended to illustrate, not limit, the present teachings, according to an embodiment of the present invention.

DETAILED DESCRIPTION OF THE INVENTION

Figure 1:
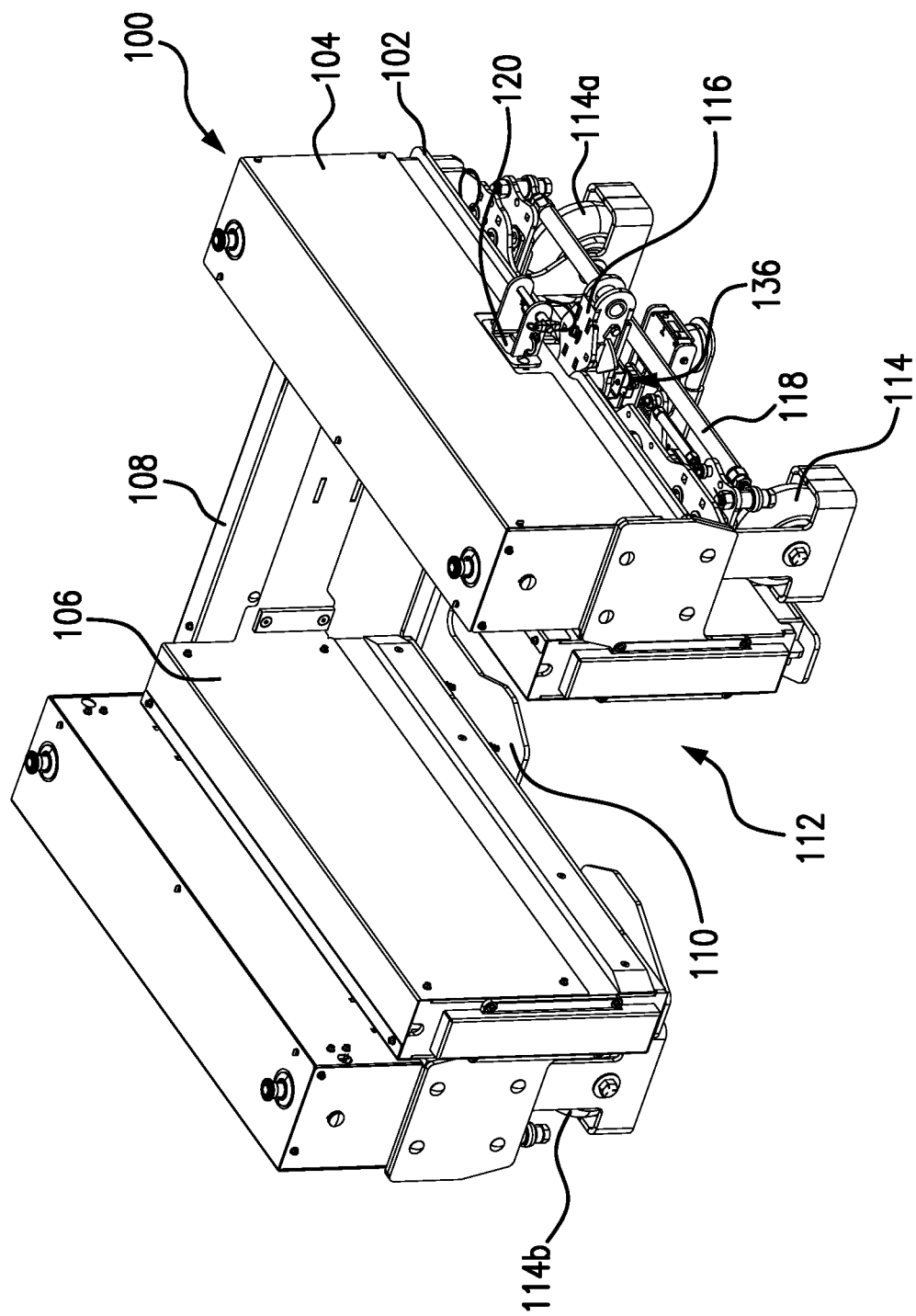
FIG. 1 is a perspective view of a tugger cart having a single bay, according to an embodiment of the present invention.

According to one or more embodiments, the present invention includes a tugger cart system that can be part of a tugger and rider cart assembly. The tugger cart system includes at least a tugger cart and a controller. The tugger cart includes a tugger frame, internal parts coupled to the frame, and covers that cover the internal parts. The tugger frame has at least a front member, a rear member, and a transverse member connecting the front member to the rear member. At least one bay is defined by the front member and the rear member. The bay is dimensioned to receive a rider cart. At least one platform is coupled to the tugger frame within the bay. The platform is configured to secure a rider cart within the bay.

The tugger cart further includes a plurality of wheels operatively coupled to the tugger frame. The plurality of wheels is coupled to a bottom of the tugger frame and supports the tugger frame in an upright position when resting on a surface. The plurality of wheels allows the tugger cart to roll on the surface, such as a floor of an industrial building. At least a portion of the plurality of wheels pivot about a vertical axis to steer left and right. The tugger cart includes at least one motor that pivots the portion of the plurality of wheels from side to side to steer the plurality of wheels.

The present invention further includes at least one connector bracket. The connector bracket connects multiple tugger carts together to form a train of tugger carts. The connector bracket is coupled to the tugger frame at a pivot point such that the at least one connector bracket pivots relative to the tugger frame from side to side along a vertical axis. The connector bracket is configured to attach the tugger frame to an adjacent tugger cart or tugger truck.

The tugger cart of the present invention further includes a sensor system. The sensor system senses a degree that the at least one connector bracket is pivoted relative to the tugger frame. The sensor system then generates electronic signals that include the degree of pivot.

The tugger cart system includes the controller. The controller is a processor that is configured to receive electronic signals from the sensor system and control the motor to steer the plurality of wheels based on the electronic signals.

The plurality of wheels can include but is not limited to caster wheels, swiveling wheels, fixed wheels, or a combination thereof. The plurality of wheels can be a wide variety of sizes and types to fit the particular use and environment of use. The plurality of wheels can be made out of a wide variety of materials, including but not limited to, metal wheels, rubber wheels, synthetic wheels, and the like. In certain embodiments, the plurality of wheels includes a front pair of wheels operatively coupled to the front member and a rear pair of wheels operatively coupled to the rear member.

As mentioned above, the motor pivots the wheels from side to side to steer the wheels. In certain embodiments, the present invention utilizes tie rods to steer the wheels. For example, a front tie rod is operatively connected to the front pair of wheels. The motor is operatively connected to the front tie rod such that when the motor is activated, the front tie rod shifts either to the right or to the left. The front tie rod is pivotably coupled to the front pair of wheels, and when the front tie rod shifts either to the right or to the left, the wheels steer either to the right or to the left. Likewise, the present invention can include a rear tie rod operatively connected to the rear pair of wheels. The motor is operatively connected to the rear tie rod such that when the motor is activated, the rear tie rod shifts either to the right or to the left. The rear tie rod is pivotably coupled to the rear pair of wheels, and when the rear tie rod shifts either to the right or to the left, the wheels steer either to the right or to the left.

The present invention can utilize one or more motors. For example, the present invention can include a front motor and a rear motor. The front motor can be coupled to the front member of the tugger frame and the rear motor can be coupled to the rear member of the tugger frame. The front motor is operatively coupled to the front tie ride and the rear motor is operatively coupled to the rear tie rod. The front motor and the rear motor can be activated independently of one another. For example, the controller can send different signals to the front motor and to the rear motor, such that the degree of steering, the rate of steering, and the timing of the steering are different between the front pair of wheels and the rear pair of wheels of the same tugger cart.

The tugger cart of the present invention can include one or more bays. For example, the tugger cart can include two bays, each of the bays configured to receive and secure a respective rider cart. In such embodiments, the tugger frame can include a central member disposed in between the front member and the rear member. The central member is coupled to the transverse member. A first bay can be defined by the front member and the central member, and a second bay can be defined by the central member and the rear member. The tugger cart can include three or more bays as well. For example, the tugger cart can have more than one central member where bays are defined therebetween.

When the tugger cart has more than one bay, each of the bays can include a respective platform. For example, the first bay can include a first platform and the second bay can include a second platform. The first platform is configured to secure a first rider cart within the first bay and the second platform is configured to secure a second rider cart within the second bay.

As described above, the sensor system senses a degree that the at least one connector bracket is pivoted relative to the tugger frame. The sensor system then generates an electronic signal including the degree of pivot. The sensor system can include a transmitter and a receiver. One of the transmitter and the receiver is coupled to the tugger frame and the other of the transmitter and the receiver is coupled to the at least one connector bracket. For example, the transmitter can be coupled to the connector bracket and the receiver can be coupled to the tugger frame, or the receiver can be coupled to the connector bracket and the transmitter can be coupled to the tugger frame.

The tugger frame can include a sensor system mount that is static relative to the tugger frame. The transmitter or receiver can be coupled to an upper surface of the sensor system mount. The other of the transmitter and receiver can be coupled to a lower surface of the connector bracket. Thus, the transmitter and the receiver are facing one another. The sensor system can then sense the degree in which the connector bracket pivots relative to the tugger frame. The sensor system can include an encoder, a resolver, or the like.

The tugger cart can include more than one connector bracket. For example, the tugger cart can include a front connector bracket that connects to another tugger cart or tugger truck at the front end and a rear connector bracket that connects to another tugger cart or tugger truck at the rear end. The front connector bracket can be pivotably connected to the front member of the tugger frame and the rear connector bracket can be pivotably connected to the rear member of the tugger frame.

When the tugger cart has more than one connector bracket, the tugger cart can have more than one sensor system. A respective sensor system can be used for sensing a degree of pivot for each connector bracket. In such embodiments, a front sensor system can sense a degree of pivot that the front connector bracket pivots relative to the tugger frame and a rear sensor system can sense a degree of pivot that the rear connector bracket pivots relative to the tugger frame. Each of the front sensor system and the rear sensor system generates separate and distinct electronic signals that are received by the controller.

The tugger carts can be connected together electrically and mechanically. The mechanical connection can be via a tongue, a connector piece, a link arm, and the like. The mechanical connection can further utilize a hitch and ball connector, a clasp, a clamp, a male and female connectors, snap connectors, a pin and slot connectors, and the like. The electrical connection can be via hard wire connections that plug into other hard wire connections of other tugger carts or tugger truck, wireless connections capable of sending and receiving electronic signals wirelessly, or both.

In certain embodiments, the tugger cart can utilize a togue with a hitch and ball connector. The tongue can pivotably couple to the connector bracket along a horizontal axis at a second pivot point. In certain embodiments, the tongue can be in a stowed position and a deployed position. The tongue pivots upward to be disposed in a vertical direction in a stowed position and pivots downward to be disposed in a horizontal direction in a deployed position where it is configured to connect with an adjacent tugger cart or tugger truck. A front tongue can be coupled to the front connector bracket and a rear tongue can be coupled to the rear connector bracket. The front and rear tongues are configured to couple to tongues or connector brackets of adjacent tugger carts or tugger truck.

The electrical connection can be accomplished using connection interfaces. A connection interface of a first tugger cart can connect with a connection interface of another tugger cart via hard wire connection, wireless connection, or both. In certain embodiments, the tugger cart includes a front connection interface disposed at the front member and a rear connection interface disposed at the rear member. The front connection interface and the rear connection interface are electrically connected to the at least one motor, the actuators, the at least one sensor system, and the controller via hard wire connection, wireless connection, or both. The front connection interface can connect to a rear connection interface of a hitch control, a tugger cart, or tugger truck in front of the tugger cart and the rear connection interface can connect to a front connection interface of the other tugger cart behind the tugger cart, a hitch control, or tugger truck.

The tugger cart can further include at least one automated lift assembly coupled to the tugger frame. The automated lift assembly is configured to raise the platform relative to the tugger frame in a vertical direction upon a first activation, and lower the platform relative to the tugger frame in the vertical direction upon a second activation.

The lift assembly can include an actuator that lifts the platform up upon the first activation and lowers the platform down upon the second activation. The actuator can include any type of actuator, such as a hydraulic actuator, a pneumatic actuator, an electrical actuator, a magnetic actuator, a mechanical actuator, and the like, as long as the actuator is capable of lifting the platform up and down relative to the frame.

In certain embodiments, the actuator includes a piston configured to extend and retract in a horizontal direction. An actuator bracket is coupled to the piston and is configured to move with the piston in the horizontal direction. A sliding frame is fixedly coupled to the at least one platform and slidably coupled to the tugger frame such that the sliding frame slides vertically relative to the tugger frame.

The automated lift assembly can further include pivoting link arms that connect the actuator to the sliding frame. Thus, the movement of the piston in the horizontal direction translates into the movement of the sliding frame in the vertical direction. For example, at least a first pair of link arms can include a first link arm and a second link arm. The first link arm has a first end pivotably coupled to the tugger frame and a second end pivotably coupled to the actuator bracket. The second link arm has a first end pivotably coupled to the sliding frame and a second end pivotably coupled to the actuator bracket.

The automated lift assembly can further include a second pair of link arms. The second pair of link arms includes a third link arm and a fourth link arm. The third link arm has a first end pivotably coupled to the tugger frame and a second end pivotably coupled to the actuator bracket. The fourth link arm has a first end pivotably coupled to the sliding frame and a second end pivotably coupled to the actuator bracket. The second pair of link arms are coupled at an opposite end of the actuator bracket relative to the first pair of link arms, and increase support and load capacity to the automated lift assembly.

In such embodiment, when the automated lift assembly is activated to raise the platform, the piston extends in the horizontal direction such that the actuator bracket pivots the first pair of link arms and the second pair of link arms to an extended position that lifts the sliding frame relative to the tugger frame, and thereby lifts the platform to an elevated position. When the automated lift assembly is activated to lower the platform, the piston retracts in the horizontal direction such that the actuator bracket pivots the first pair of link arms and the second pair of link arms to a retracted position that lowers the sliding frame relative to the tugger frame, and thereby lowers the platform from the elevated position.

The present invention can include multiple automated lift assemblies. Each of the automated lift assemblies can include some or all of the components that are part of the automated lift assembly described above. A first automated lift assembly can be attached to the front member of the tugger frame and a second automated lift assembly can be attached to the second member. The first and second automated lift assemblies can include the same parts but the parts can in a mirrored configuration relative to one another. Thus, the first automated lift assembly can be coupled to a first side of the platform and the second automated lift assembly can be coupled to a second side of the platform opposite the first side. Furthermore, if the tugger cart assembly has multiple bays, a first automated lift assembly can be attached to the front member, a second automated lift assembly can be attached to the central member, a third automated lift assembly can be attached to the central member and a fourth automated lift assembly can be attached to the rear member. Thus, two automated lift assemblies can connect to each platform within each bay.

Two automated lift assemblies that are used for the same bay can be synchronized to lift and lower the platform at an even pace, thus keeping the platform level. In certain embodiments, sensors can be used to sense how much the sliding frame for each of the automated lift assemblies is lifted or lowered vertically relative to the tugger frame. The sensors can communicate with the controller and the controller can control the actuators of the automated lift assemblies such that the automated lift assemblies maintain an even level, thus preventing binding or off-parallel lifting and lowering.

The controller of the present invention performs numerical calculations, arithmetic processing, and various kinds of information processing based on various programs, and also controls the motors, actuators, or both of the tugger cart. The controller includes a central processing unit, a memory, such as RAM that functions as a work area when the controller executes various programs, and a program memory such as ROM, flash ROM and EEPROM in which a program is stored.

The controller can be part of the tugger cart, remote from the tugger cart, part of a hitch control, or a combination thereof. When the controller is remote from the tugger cart, the electronic signals can be sent wirelessly between the controller and a wireless receiver that is coupled to the motors, actuators, or both. The program loaded on the controller can process the electronic signals to control the motors, actuators, or both.

With regard to the controller controlling the motors, the direction of pivot, the rate of pivot, and the degree of pivot of the connector bracket can be used to calculate an optimal direction of steering, rate of steering, and degree of steering for each pair of wheels for each of the tugger carts that are part of the train. For example, the direction of pivot, the rate of pivot, and the degree of pivot of the connector bracket can be equal to the direction of steering, rate of steering, and degree of steering for each of the pair of wheels that are part of the same tugger cart as the connector bracket. Alternatively, different algorithms can be used to calculate the optimal direction of steering, rate of steering, and degree of steering for each pair of wheels.

The present invention can include the hitch control. The hitch controller has a housing that houses the controller and a user interface that is disposed at a surface of the housing such that a user can easily access the user interface. The user interface can be used by the user to interact with and control the controller. The user interface can be used to control multiple functions of the tugger cart. For example, the user interface can include an on/off switch, a raise button and a lower button for the automated lift assemblies, a reset button, an error indicator, a touchscreen, or a combination thereof. The hitch control can be releasably connected to the front connection interface of the tugger cart to communicate with the motors, the sensor systems, and the actuators of all of the tugger carts connected in a train.

While in use, a plurality of tugger carts can be connected together in the train. The plurality of tugger carts can include at least a first tugger cart and a second tugger cart. The first tugger cart and the second tugger cart can include the same components. The hitch control can be releasably secured to a tugger truck, or, alternatively, can be releasably secured directly to one of the first and second tugger carts. The first and second tugger cart can be releasably secured to the tugger truck by the hitch control or by some other connection.

In certain embodiments, in which a hitch control is not used, a first tugger cart can be a primary tugger cart that includes the controller fixedly attached, and a second tugger cart, as well as any other tugger cart attached to the train, can be secondary tugger carts that do not include a controller. The controller of the first tugger cart can send and receive signals from each of the tugger carts connected in a train.

The second tugger cart can include a second tugger frame having a second front member, a second rear member, and a second transverse member connecting the second front member to the second rear member. One or more second bays are defined by the second front member and the second rear member, and an optional central member. The second bay is dimensioned to receive a rider cart. At least one second platform is configured to secure a rider cart within the second bay of the second tugger frame. A second plurality of wheels are operatively coupled to the second tugger frame. At least one second motor pivots the second plurality of wheels from side to side to steer the second plurality of wheels. At least one second connector bracket is coupled to the second tugger frame at a pivot point such that the at least one second connector bracket pivots relative to the second tugger frame from side to side along a second vertical axis. At least one second sensor system senses a degree that the at least one second connector bracket is pivoted relative to the second tugger frame and generates a second electronic signal including the degree of pivot. The second tugger cart can further include the automated lift assemblies described above, as well as the sensors of the automated lift assemblies. A second connection interface is electrically connected to the at least one second motor, the at least one second sensor system, and the actuators of the automated lift assemblies.

To mechanically connect the tugger carts together, the at least one second connector bracket of the second tugger cart is connected to the at least one connector bracket of the first tugger cart by a connection link or other connector mentioned above. To electrically connect the tugger carts together, the second connection interface of the second tugger cart is connected to the connection interface of the first tugger cart. The controller then receives electronic signals from the at least one sensor system of the first tugger cart, from the at least one second sensor system of the second tugger cart, from the sensors of the automated lift assemblies of the first tugger cart, and from the sensors of the automated lift assemblies of the second tugger cart. The controller then controls the at least one motor of the first tugger cart, the at least one second motor of the second tugger cart, independently, to steer the plurality of wheels of the first tugger cart and the second plurality of wheels of the second tugger cart, based on the electronic signals. The controller can also control the actuators of the automated lift assemblies of the first tugger cart and the second tugger cart.

To load the rider carts within the bays of the tugger carts, a user can roll the rider carts into the bays. The user or another user can press the raise button(s) of the hitch control. The hitch control is electrically connected to the front connection interface of the first tugger cart. All of the tugger carts that are part of the train are electrically connected together, and thus are electrically connected to the hitch control. Consequently, the hitch control can be used to raise each pair of automated lift assemblies for each bay independent of one another or at the same time upon an activation of a raise button(s) of the hitch control. The rider carts are then raised to an elevated position. Sensors of a pair automated lift assemblies within a single bay can send signals to the hitch control. The hitch control processes the signals and controls the actuators to lift the sliding frames at the same pace such that the rider carts are level while being raised by the platforms.

A tugger truck can be connected to the first tugger cart via the hitch control or another connection. The tugger truck can be a user driven tugger truck or an autonomous tugger truck, such as an automated guided vehicle (AGV), autonomous mobile robot (AMR), and the like. Once the rider carts are raised up and off the ground, the tugger truck can drive the train of tugger carts from a loading area to a drop-off area. As the tugger truck is driving, the controller receives electronic signals from the sensor systems. When the tugger truck steers to a different direction, the front sensor system begins to send signals to the hitch control of the degree of pivot of the front connecter bracket relative to the tugger frame, which indicates a degree of steering that is taking place. The sensor system then sends an electronic signal that includes the degree of steering to the control hitch. The controller of the control hitch can determine an optimal direction of steering, rate of steering, and degree of steering for each pair of wheels for each of the tugger carts that are part of the train. The controller can then activate the motors to steer the plurality of wheels at an optimal steering direction for the particular turn. As the tugger truck continues to turn, additional sensor systems sense additional degrees of pivot of different connector brackets and continue to send electronic signals. The controller can continue to process these electronic signals to dynamically steer each of the pair of wheels of each of the tugger carts of the train to efficiently steer the train around each of the turns until the train reaches the drop-off location.

To unload the rider carts from the bays of the tugger carts, a user can press the lower button or lower buttons of the hitch control. When the lower button(s) of the hitch control is pressed, each of the pairs automated lift assemblies for each bay of each of the tugger carts can lower independently of one another or at the same time, and lower the rider carts to the ground. The sensors of the automated lift assemblies can each send signals to the hitch control. The hitch control processes the signals and controls the actuators to lower the sliding frames at the same pace such that the rider carts are level while being lowered by the platforms. A user can then roll the rider carts out of the bays and to a desired location.

With reference now to the drawings, FIG. 1 depicts a tugger cart 100 having a single bay 112. Tugger cart 100 includes a tugger frame 102. Tugger frame 102 has at least a front member 104, a rear member 106, and a transverse member 108 connecting front member 104 to rear member 106. Bay 112 is defined by front member 104 and rear member 106. Bay 112 is dimensioned to receive a rider cart. A platform 110 is coupled to tugger frame 102 within bay 112. Platform 110 is configured to secure a rider cart within bay 112.

Tugger cart 100 further includes a plurality of wheels 114 operatively coupled to tugger frame 102. Plurality of wheels 114 is coupled to a bottom of tugger frame 102 and supports the tugger frame 102 in an upright position when resting on a surface. Plurality of wheels 114 allows tugger cart 100 to roll on the surface, such as a floor of an industrial building. Plurality of wheels 114 pivot about a vertical axis to steer left and right. Plurality of wheels 114 can include a front pair of wheels 114a secured to front member 104 and a rear pair of wheels 114b secured to rear member 106. A tie rod 118 can be coupled to plurality of wheels 114. A motor (not shown) is operatively connected to tied rod 118. The motor shifts tie rod 118 side to side to steer plurality of wheels 114.

Front member 104 further includes a connector bracket 116. Connector bracket 116 connects multiple tugger carts together to form a train of tugger carts. Connector bracket 116 is coupled to tugger frame 102 at a pivot point such that connector bracket 116 pivots relative to the tugger frame 102 from side to side along a vertical axis. Connector bracket 116 is configured to attach tugger frame 102 to an adjacent tugger cart, hitch control, or tugger truck.

A sensor system 136 is coupled to front member 104. Sensor system 136 senses a degree that connector bracket 116 is pivoted relative to tugger frame102. Sensor system 136 then generates an electronic signal that includes the degree of pivot. A controller (not shown) receives electronic signals from sensor system 136 and controls the motor to steer plurality of wheels 114 based on the electronic signal.

Tugger cart 100 includes a connection interface 120 disposed at front member 104. Connection interface 120 is electrically connected to the motor, sensor system 136, and the controller via hard wire connection, wireless connection, or both. Connection interface 120 can connect to a connection interface of a tugger cart, tugger truck, or hitch control.

Figure 2A:
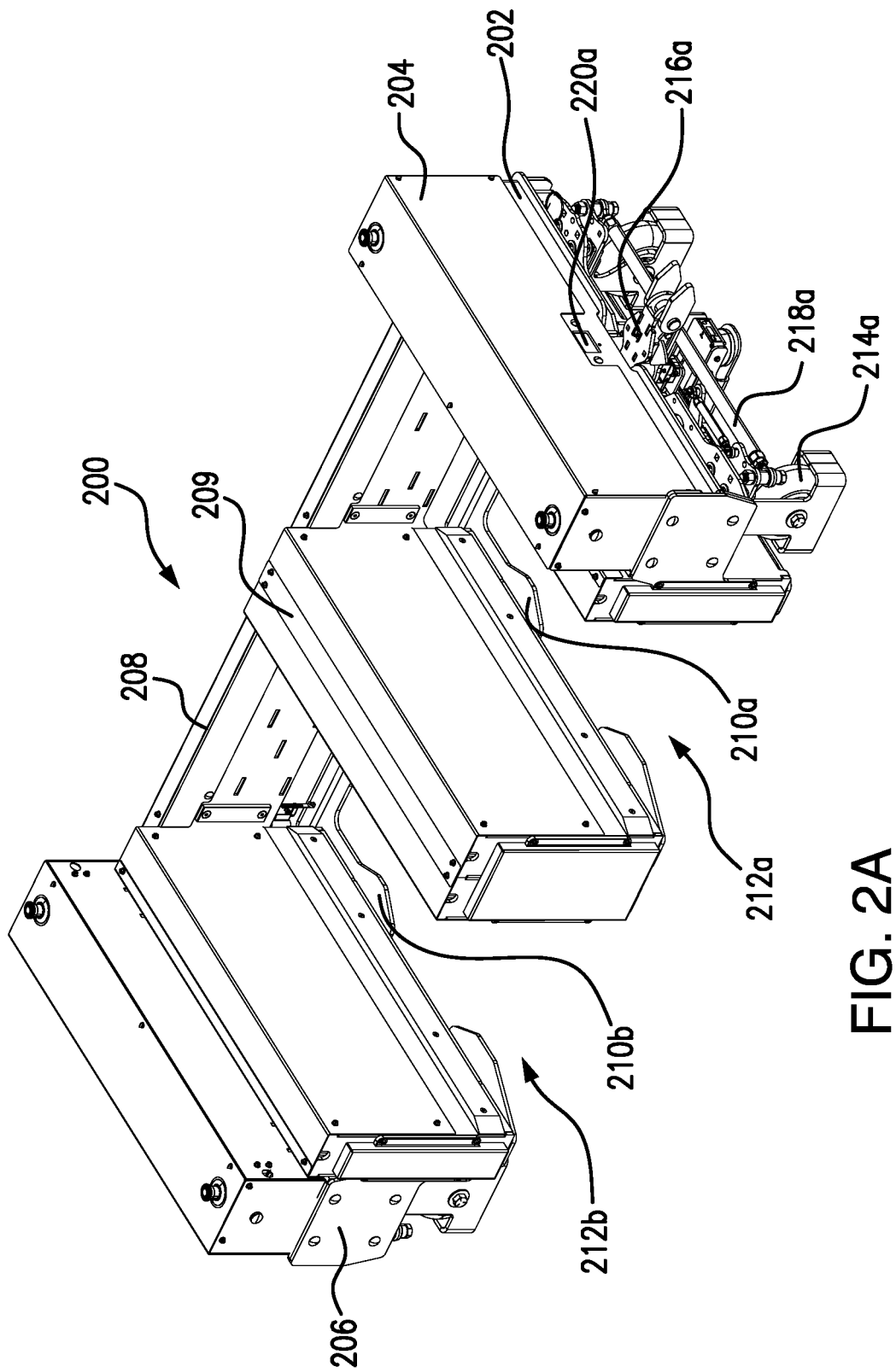
FIG. 2A is a perspective view of a tugger cart having two bays, according to another embodiment of the present invention.
Figure 2B:
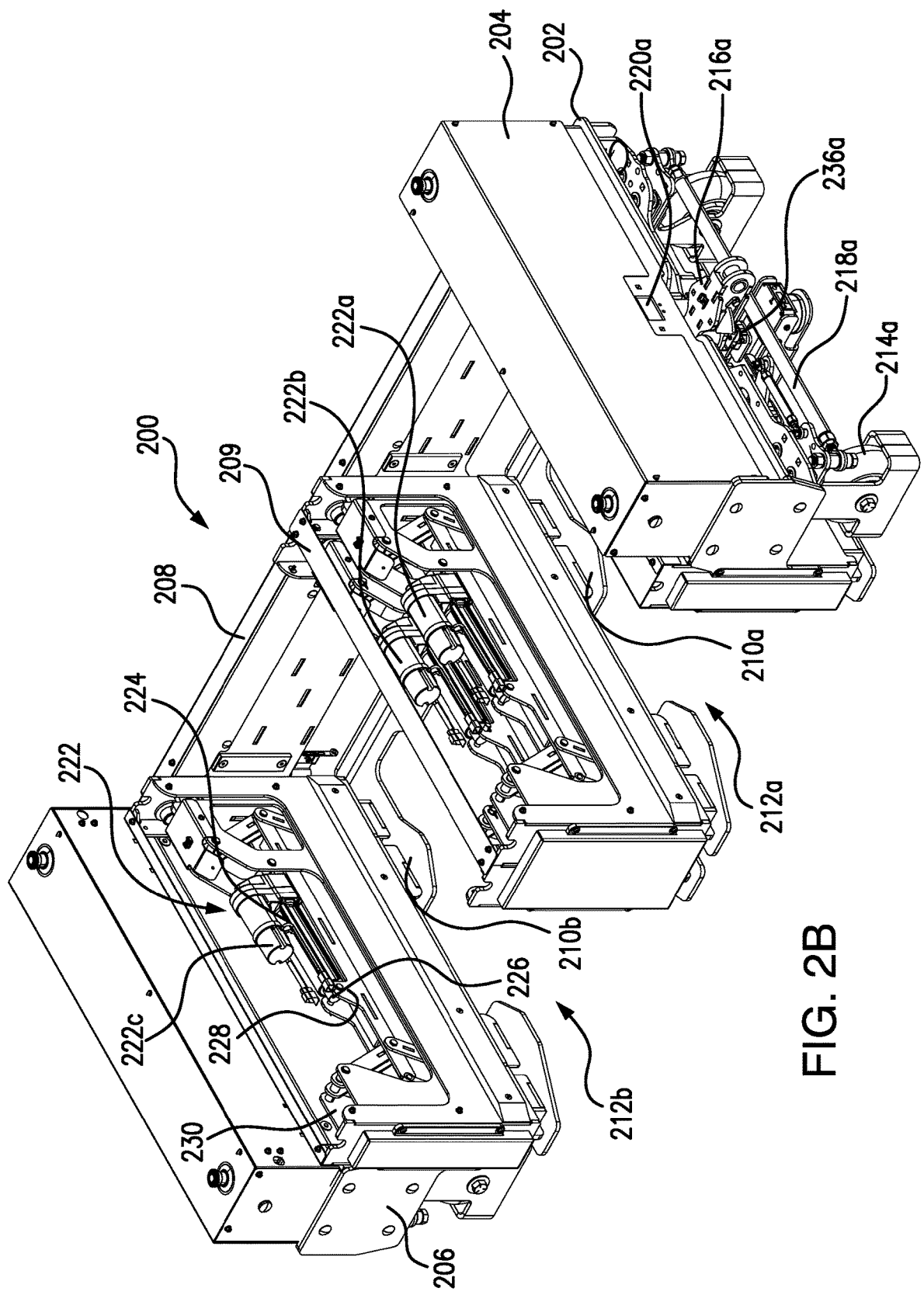
FIG. 2B is a perspective view of the tugger cart shown in FIG. 2A, with covers removed from a frame to illustrate internal parts of the tugger cart.
Figure 2C:
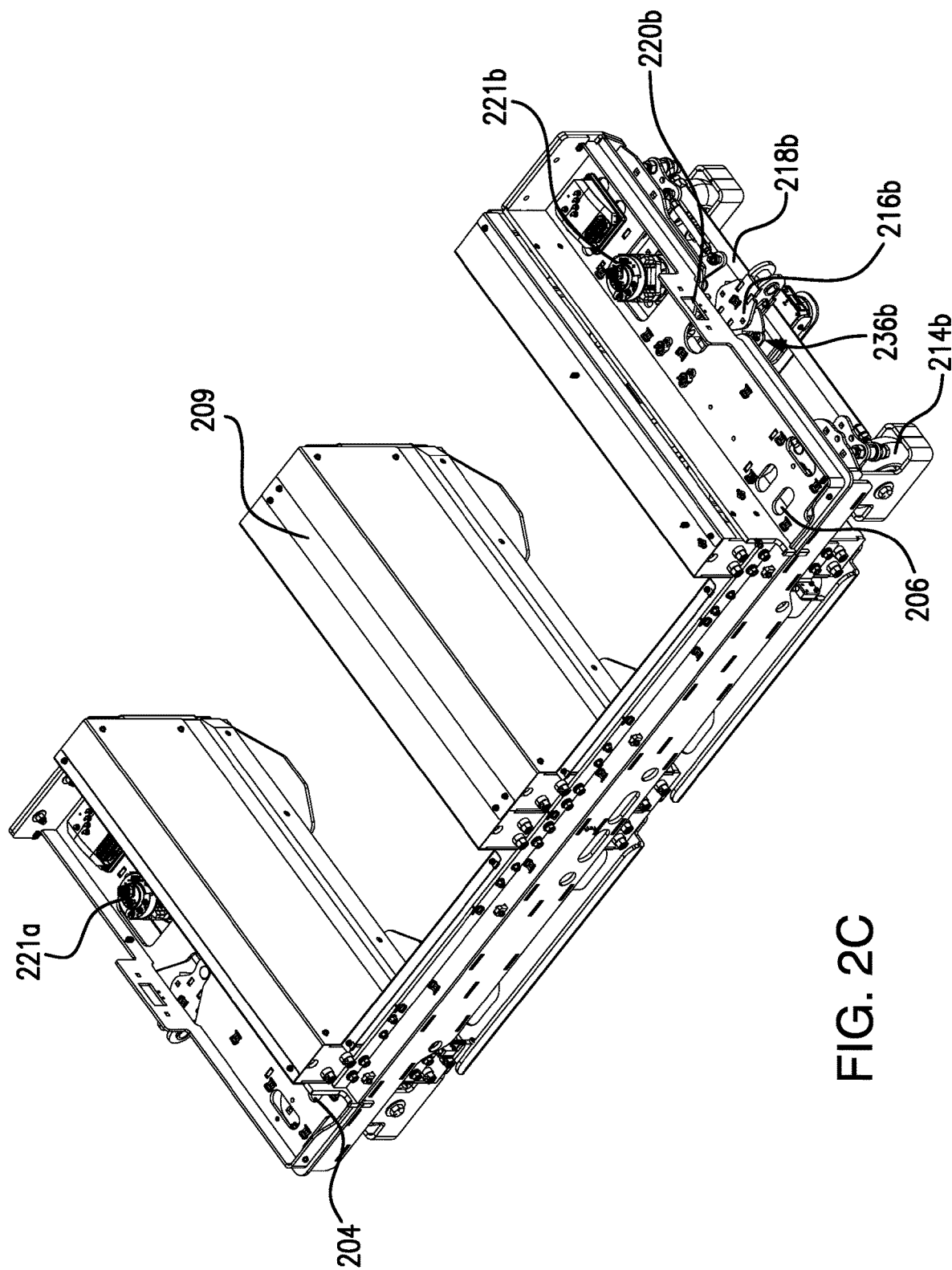
FIG. 2C is a perspective view showing an opposite side of the tugger cart shown in FIG. 2A, with different covers removed from the frame to illustrate different internal parts of the tugger cart.

FIG. 2A-2C depict a tugger cart 200 having a first bay 212a and a second bay 212b. Tugger cart 200 includes a tugger frame 202. Tugger frame 202 has at least a front member 204, a rear member 206, and a transverse member 208 connecting front member 204 to rear member 206. A central member 209 is disposed in between front member 204 and rear member 206. Central member 209 is coupled to transverse member 208. First bay 212a is defined by front member 204 and central member 209, and second bay 212b is defined by central member 209 and rear member 206. A first platform 210a is coupled to tugger frame 202 within first bay 212a and a second platform 210b is coupled to tugger frame 202 within second bay 212b. First platform 210a and second platform 210b are each configured to secure a rider cart within first bay 212a and second bay 212b, respectively.

Tugger cart 200 further includes a front pair of wheels 214a and a rear pair of wheels 214b operatively coupled to tugger frame 202. Front pair of wheels 214a and rear pair of wheels 214*b* are coupled to a bottom of tugger frame 202 and support tugger frame 202 in an upright position when resting on a surface. Front pair of wheels 214*a* and rear pair of wheels 214*b* allow tugger cart 200 to roll on the surface, such as a floor of an industrial building. Front pair of wheels 214*a* and rear pair of wheels 214*b* pivot about a vertical axis to steer left and right. A front tie rod 218*a* is coupled to front pair of wheels 214*a* and a rear tie rod 218*b* is coupled to rear pair of wheels 214*b*. A front motor 221*a* is operatively connected to front tied rod 218*a* and a rear motor 221*b* is operatively connected to rear tied rod 218*b*. Front motor 221*a* shifts front tie rod 218*a* side to side to steer front pair of wheels 214*a* and rear motor 221*b* shifts rear tie rod 218*b* side to side to steer rear pair of wheels 214*b*. Front motor 221*a* and rear motor 221*b* can work independently of one another.

Front member 204 further includes a front connector bracket 216*a*. Front connector bracket 216*a* is coupled to tugger frame 202 at a pivot point such that front connector bracket 216*a* pivots relative to tugger frame 202 from side to side along a vertical axis. Front connector bracket 216*a* is configured to attach tugger frame 202 to an adjacent tugger cart, hitch control, or tugger truck at the front of tugger cart 200.

Rear member 206 further includes a rear connector bracket 216*b*. Rear connector bracket 216*b* is coupled to tugger frame 202 at a pivot point such that rear connector bracket 216*b* pivots relative to tugger frame 202 from side to side along a vertical axis. Rear connector bracket 216*b* is configured to attach tugger frame 202 to an adjacent tugger cart, hitch control, or tugger truck at the rear of tugger cart 200.

A front sensor system 236*a* is coupled to front member 204. Front sensor system 236*a* senses a degree that front connector bracket 216*a* is pivoted relative to tugger frame 202. Front sensor system 236*a* then generates an electronic signal that includes the degree of pivot. A controller (not shown) receives electronic signals from front sensor system 236*a* and controls front motor 221*a*, rear motor 221*b*, or both to steer front pair of wheels 214*a*, rear pair of wheels 214*b*, or both based on the electronic signal.

A rear sensor system 236*b* is coupled to rear member 206. Rear sensor system 236*b* senses a degree that rear connector bracket 216*b* is pivoted relative to tugger frame 202. Rear sensor system 236*b* then generates an electronic signal that includes the degree of pivot. The controller (not shown) receives electronic signals from rear sensor system 236*b* and controls front motor 221*a*, rear motor 221*b*, or both to steer front pair of wheels 214*a*, rear pair of wheels 214*b*, or both based on the electronic signal.

Tugger cart 200 includes a front connection interface 220*a* disposed at front member 204 and a rear connection interface 220*b* disposed at rear member 206. Front and rear connection interfaces 220*a*, 220*b* are electrically connected to the motors 221*a*, 221*b*, sensor systems 236*a*, 236*b*, actuators 224, and optionally, the controller, via hard wire connection, wireless connection, or both. Front and rear connection interfaces 220*a*, 220*b* can connect to a connection interface of a tugger cart, tugger truck, or hitch control.

FIG. 2B illustrates internal components of tugger cart 200, showing automated lift assemblies 222. Automated lift assemblies 222 are configured to raise first platform 210*a* and second platform 210*b* relative to tugger frame 202 in a vertical direction upon a first activation, and lower first platform 210*a* and second platform 210*b* relative to tugger frame 202 in the vertical direction upon a second activation.

Automated lift assemblies 222 can include a first automated lift assembly (not shown) connected to front member 204, a second automated lift assembly 222*a* connected to central member 209, a third automated assembly 222*b* connected to central member 209, and a fourth automated lift assembly 222*c* connected to rear member 206. The first and second automated lift assemblies 222*a* is a first pair of automated lift assemblies, and the third and fourth automated lift assemblies 222*b*, 222*c* is a second pair of automated lift assemblies. The first pair and the second pair of automated lift assemblies can be lifted and lowered independently or concurrently.

Each automated lift assembly 222 includes an actuator 224 that lifts first platform 210*a* and second platform 210*b* up upon the first activation and lowers first platform 210*a* and second platform 210*b* down upon the second activation. Actuators 224 each include a piston 226 configured to extend and retract in a horizontal direction. An actuator bracket 228 is coupled to piston 226 and is configured to move with piston 226 in the horizontal direction. Sliding frames 230 are fixedly coupled to respective first platform 210*a* and second platform 210*b*, and are slidably coupled to tugger frame 202 such that sliding frames 230 slides vertically relative to tugger frame 202.

Figure 3:
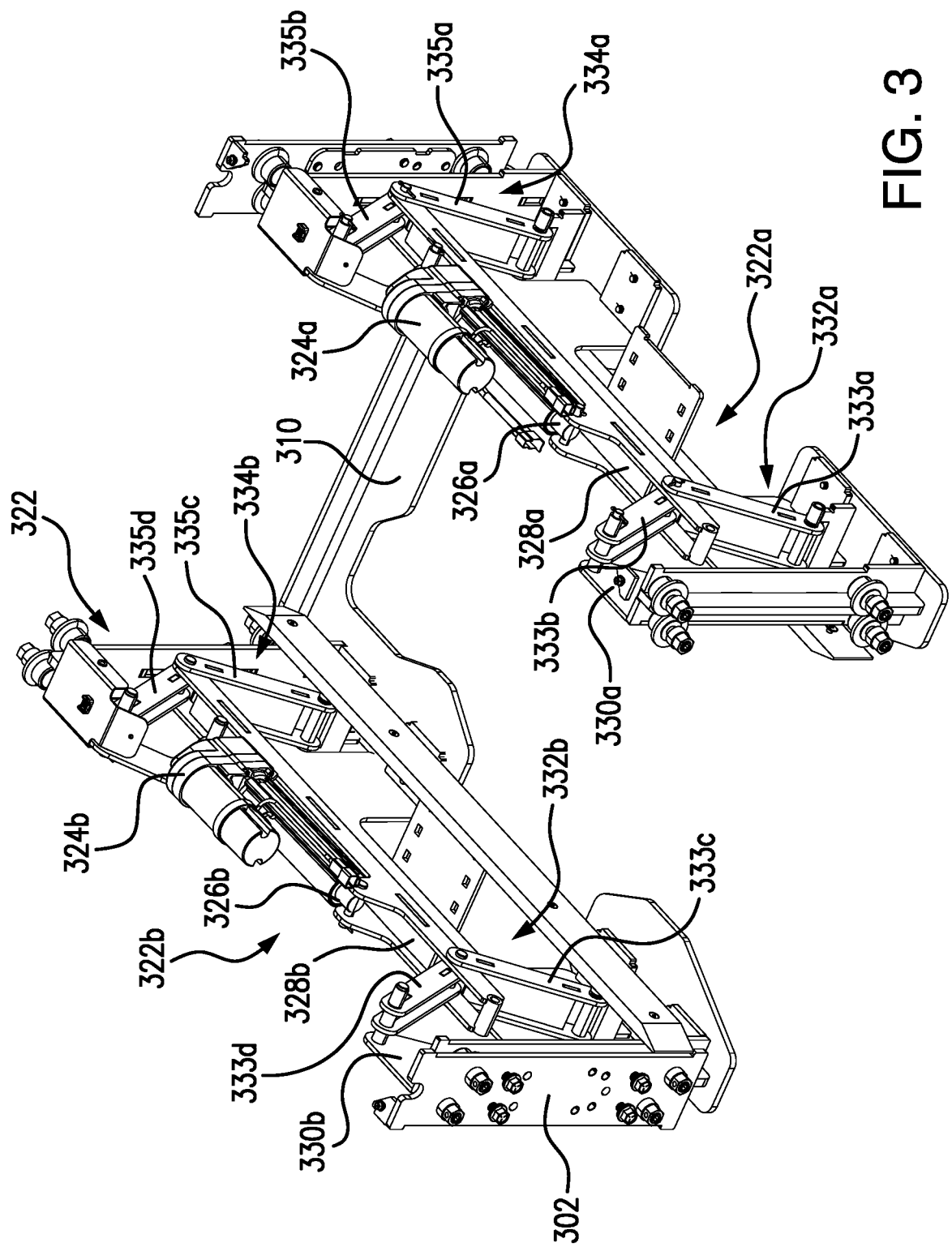
FIG. 3 is a perspective view of automated lift assemblies, according to an embodiment of the present invention.

FIG. 3 illustrates a pair of automated lift assemblies 322 of the present invention. Automated lift assemblies 322 can include a first automated lift assembly 322*a* and a second automated lift assembly 322*b*. The first automated lift assembly 322*a* can be part of a front member of a tugger frame 302 and second automated lift assembly 322*b* can be part of a rear member of tugger frame 302. Alternatively, first automated lift assembly 322*a* can be part of the front member and second automated lift assembly 322*b* can be part of the central member, or first automated lift assembly 322*a* can be part of the central member and second automated lift assembly 322*b* can be part of the rear member. Each of first lift automated assembly 322*a* and second automated lift assembly 322*b* are attached to one or more platforms 310. First automated lift assembly 322*a* and second automated lift assembly 322*b* can lift and lower platform 310 in a synchronized manner.

First automated lift assembly 322*a* includes a first actuator 324*a*. First actuator 324*a* includes a first piston 326*a* configured to extend and retract in a horizontal direction. A first actuator bracket 328*a* is coupled to first piston 326*a* and is configured to move with first piston 326*a* in the horizontal direction. A first sliding frame 330*a* is fixedly coupled to platform 310 and slidably coupled to tugger frame 302 such that first sliding frame 330*a* slides vertically relative to tugger frame 302.

A first pair of link arms 332*a* includes a first link arm 333*a* and a second link arm 333*b*. First link arm 333*a* has a first end pivotably coupled to tugger frame 302 and a second end pivotably coupled to first actuator bracket 328*a*. Second link arm 333*b* has a first end pivotably coupled to first sliding frame 330*a* and a second end pivotably coupled to first actuator bracket 328*a*. A second pair of link arms 334*a* includes a third link arm 335*a* and a fourth link arm 335*b*. Third link arm 335*a* has a first end pivotably coupled to tugger frame 302 and a second end pivotably coupled to first actuator bracket 328*a*. Fourth link arm 335*b* has a first end pivotably coupled to first sliding frame 330*a* and a second end pivotably coupled to first actuator bracket 328*a*.

Second lift assembly 322*b* includes a second actuator 324*b*. Second actuator 324*b* includes a second piston 326*b* configured to extend and retract in a horizontal direction. A second actuator bracket 328*b* is coupled to second piston 326*b* and is configured to move with second piston 326*b* in the horizontal direction. A second sliding frame 330*b* is fixedly coupled to platform 310 and slidably coupled to tugger frame 302 such that second sliding frame 330*b* slides vertically relative to tugger frame 302.

A third pair of link arms 332*b* includes a first link arm 333*c* and a second link arm 333*d*. First link arm 333*c* has a first end pivotably coupled to tugger frame 302 and a second end pivotably coupled to second actuator bracket 328*b*. Second link arm 333*d* has a first end pivotably coupled to second sliding frame 330*b* and a second end pivotably coupled to second actuator bracket 328*b*.

A fourth pair of link arms 334*b* includes a third link arm 335*c* and a fourth link arm 335*d*. Third link arm 335*c* has a first end pivotably coupled to tugger frame 302 and a second end pivotably coupled to second actuator bracket 328*b*. Fourth link arm 335*d* has a first end pivotably coupled to second sliding frame 330*b* and a second end pivotably coupled to second actuator bracket 328*b*.

When automated lift assemblies 322 are activated to raise platform 310, first and second pistons 326*a*, 326*b* extend in the horizontal direction such that first and second actuator brackets 328*a*, 328*b* are urged forward and pivot first pair of link arms 332*a*, second pair of link arms 334*a*, third pair of link arms 332*b*, and fourth pair of link arms 334*b* to an extended position that lifts first and second sliding frames 330*a*, 330*b* relative to tugger frame 302, and thereby lifts platform 310 to an elevated position. When automated lift assemblies 322 are activated to lower platform 310, first and second pistons 326*a*, 326*b* retract in the horizontal direction such that first and second actuator brackets 328*a*, 328*b* are urged rearward and pivot first pair of link arms 332*a*, second pair of link arms 334*a*, third pair of link arms 332*b*, and fourth pair of link arms 334*b* to a retracted position that lowers first and second sliding frames 330*a*, 330*b* relative to tugger frame 302, and thereby lowers platform 310 from the elevated position.

Figure 4A:
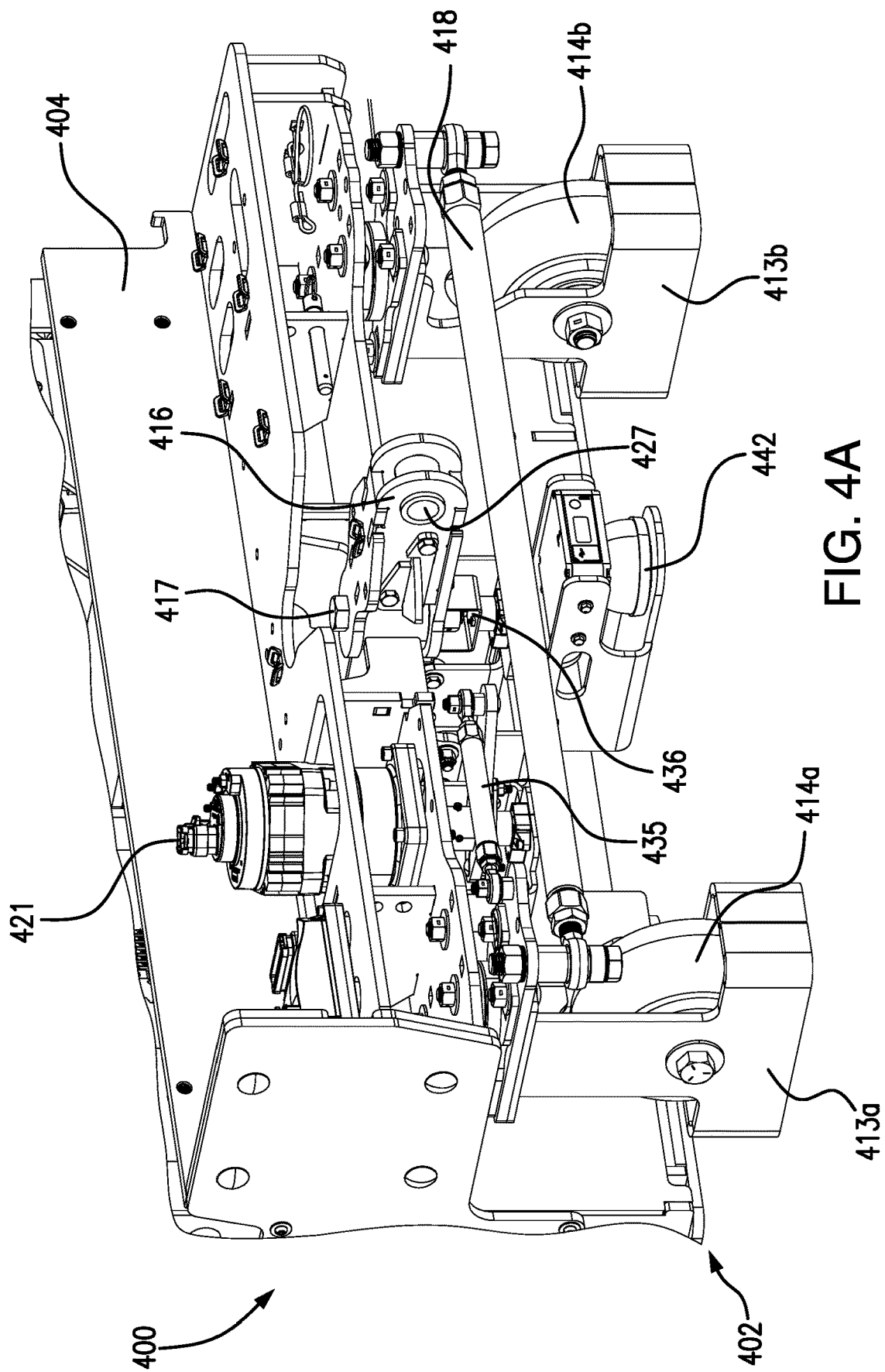
FIG. 4A is front perspective view of a tugger cart, according to an embodiment of the present invention, with covers removed from the frame to illustrate internal parts of the tugger cart.
Figure 4B:
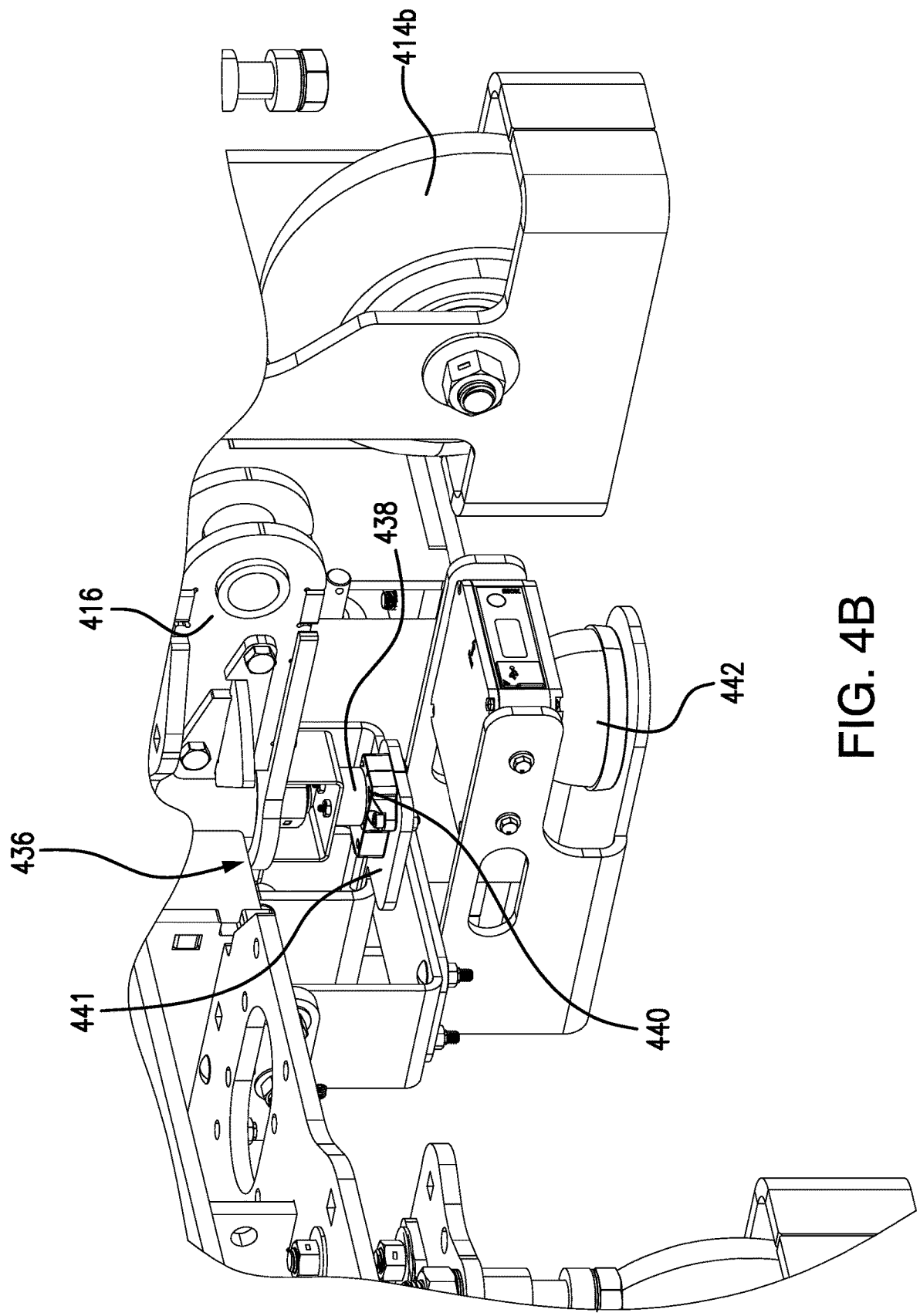
FIG. 4B is a front detail perspective view of the tugger cart shown in FIG. 4A, illustrating a sensor system of the present invention.

FIGS. 4A and 4B are front perspective views of a tugger cart 400, showing a front member 404 of a tugger frame 402. Tugger cart 400 shown in FIGS. 4A and 4B can be part of any of the embodiments of tugger carts described herein. Additionally, the rear member (not shown) of the tugger cart 400 can include the same elements shown in FIGS. 4A and 4B. As can be seen, a motor 421 is mounted to front member 404. Motor 421 is operatively connected to a tie rod 418 by a connector rod 435. When a shaft of motor 421 is rotated in a first direction, connector rod 435 shifts to a first side, which in turn shifts tie rod 418 to the first side. When the shaft of motor 421 is rotated in a second direction opposite the first direction, connector rod 435 shifts to a second side opposite the first side, which in turn shifts tie rod 418 to the second side. Tie rod 418 is pivotably connected to a first wheel cover 413*a* at a first end, and pivotably connected to a second wheel cover 413*b* at a second end. A first wheel 414*a* is rotatably secured within first wheel cover 413*a* and a second wheel 414*b* is rotatably secured within second wheel cover 413*b*. Accordingly, when the tie rod 418 shifts to the first side, the first wheel 414*a* and second wheel 414*b* are turned in a first direction and when the tie rod 418 shifts to the second side, the first wheel 414*a* and second wheel 414*b* are turned in a second direction, opposite the first direction.

Connector bracket 416 is also connected to tugger frame 402 at front member. Connector bracket 416 is connected to tugger frame 402 at a pivot point 417, such that connector bracket 416 pivots about a vertical axis relative to tugger frame 402. A tongue (not shown) can be connected to connector bracket 416 at a second pivot point 427 that allows the tongue to pivot along a horizontal axis. A sensor system 436 is coupled to connector bracket 416 and tugger frame 402. As shown in FIG. 4B, sensor system 436 includes a transmitter 438 and a receiver 440. FIG. 4B illustrates transmitter 438 coupled to connector bracket 416 and receiver 440 coupled to tugger frame 402. However, as mentioned above, receiver 440 can be coupled to connector bracket 416 and transmitter 438 can be coupled to tugger frame 402. Tugger frame 402 has a sensor system mount 441 that is static relative to tugger frame 402. Receiver 440 is illustrated as being coupled to an upper surface of sensor system mount 441. Transmitter 438 is illustrated as coupled to a lower surface of connector bracket 416. Transmitter 438 and receiver 440 are disposed below and above one another respectively, and are facing one another such when that transmitter 438 sends waves, receiver 440 is capable of receiving the waves, and the controller is configured to determine a degree of angle of connector bracket 416 relative to tugger frame 402 based on those signals.

A safety plane lidar 442 can be coupled to front member 404 of tugger frame 402. Safety plane lidar 442 determines ranges (variable distance) by targeting an object with a laser and measuring the time for the reflected light to return to the receiver. Lidar is an acronym of "light detection and ranging" or "laser imaging, detection, and ranging". Lidar sometimes is called 3-D laser scanning, a special combinationof 3-D scanning and laser scanning. Safety plane lidar 442 of tugger cart 402 detects objects and sends signals to the controller. The controller can automatically stop the train if an object is sensed to obstruct tugger cart 402, thereby preventing accidents.

Figure 5:
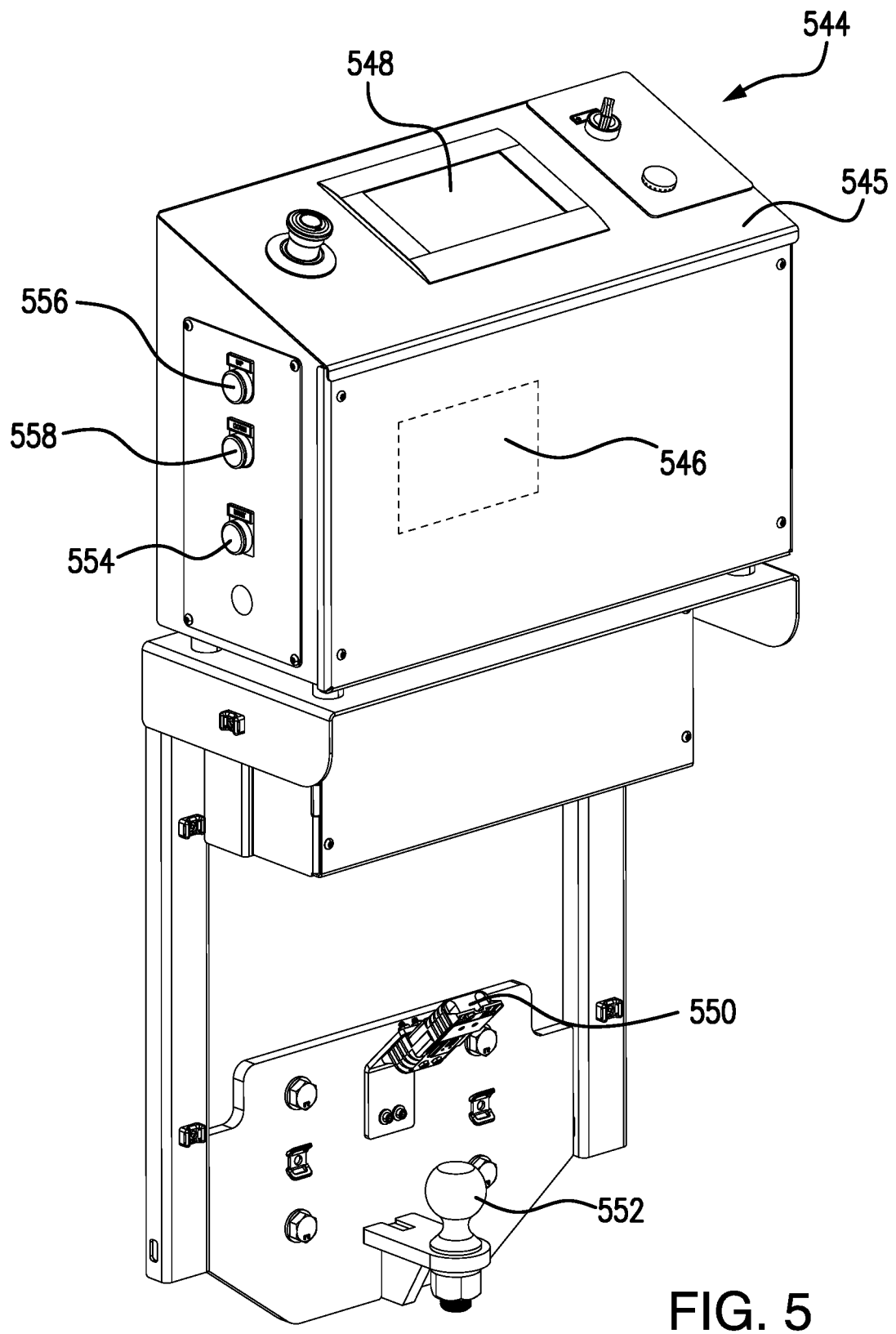
FIG. 5 is a perspective view of a hitch control, according to an embodiment of the present invention.

FIG. 5 illustrates a hitch control 544, which can be part of or used with any of the embodiments of tugger carts described herein. Hitch control 544 includes a housing 545 that houses a controller 546. Controller 546 can at least include a processor and memory. The processor of the controller executes various programs that are stored on the memory. Hitch control 544 further includes a user interface 548. As shown in FIG. 5, user interface 548 can be a screen, such as a touchscreen, that provides data of the connected tugger carts as well as touchscreen control buttons for controlling the connected tugger carts.

Hitch control 544 can further include mechanical buttons as part of the user interface, such as a power button 554, a first activation button (raise button) 556, and a second activation button (lower button) 558. Power button 554 can be used to turn power on hitch control 544, as well as power for connected tugger carts. First activation button 556 can be activated to lift each of the platforms concurrently or independently for the tugger carts that are connected to hitch control 544 and second activation button 558 can be activated to lower each of the platforms concurrently or independently for the tugger carts that are connected to hitch control 544.

Hitch control 544 can mechanically connect with a first tugger cart and electrically connect with all of the tugger carts that are part of a tugger cart train. As can be seen in FIG. 5, hitch control 544 can include a ball 552 that connects with a socket of a tongue of the first tugger cart, which mechanically fastens the first tugger cart to hitch control 544. Hitch control 544 further includes a hitch connection interface 550. Hitch connection interface 550 is electrically connected to user interface 548, mechanical buttons 554, 556, 558, and controller 546, and can also connect with other electrical components that are part of hitch control 544. Accordingly, when hitch connection interface 550 is connected to a connection interface of the first ugger cart, hitch control 544 can be used to control the functions of the first tugger cart. Further, if the first tugger cart is electrically connected to other tugger carts via connection interfaces, hitch control 544 can be used to control the functions of all of the tugger carts that are electrically connected together via the connection interfaces.

Figure 6:
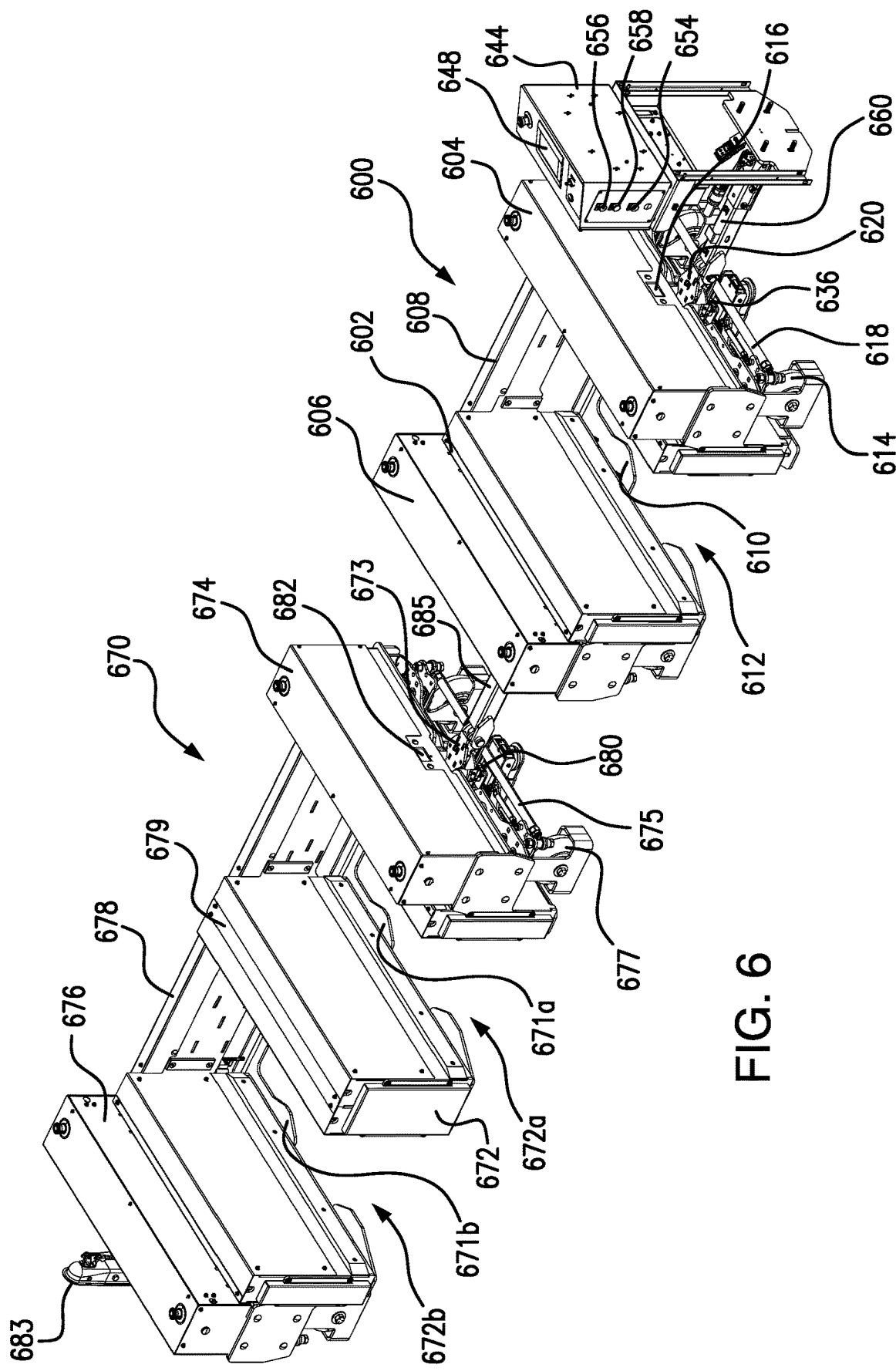
FIG. 6 is perspective view of a train of tugger carts connected together and a hitch control, according to an embodiment of the present invention.

FIG. 6 illustrates a train of tugger carts 600, 670 connected together as well as a hitch control 644 connected to first tugger cart 600 by a ball and socket connection. FIG. 6 illustrates first tugger cart 600 having a single bay 612 and second tugger cart 670 having a first bay 672a and a second bay 672b. First tugger cart 600 can have some of or all of the elements of tugger carts illustrated in FIGS. 1 and 3-5. Second tugger cart 670 can have some of or all of the elements of tugger carts illustrated in FIGS. 2-5. Furthermore, the present invention encompasses any order of tugger carts, any embodiment of tugger carts, and any amount of tugger carts that could be part of a train of tugger carts. The hitch control 644 can be fixed to a tugger truck (not shown) to drive the train of tugger carts 600, 670 around an industrial building.

First tugger cart 600 includes a tugger frame 602 having a front member 604, a rear member 606, and a transverse member 608 connecting front member 604 to rear member 606. A bay 612 is defined by front member 604 and rear member 606. Bay 612 is dimensioned to receive a rider cart (not shown). A platform 610 is configured to secure a rider cart within bay 612 of the tugger frame 602.

A plurality of wheels 614 are operatively coupled to tugger frame 602. At least one motor (not shown) pivots plurality of wheels 614 from side to side to steer plurality of wheels 614 via a tie rod 618. A front connector bracket 620 is coupled to tugger frame 602 at a pivot point such that front connector bracket 620 pivots relative to tugger frame 602 from side to side along a vertical axis. A front sensor system 636 senses a degree that front connector bracket 620 is pivoted relative to tugger frame 602 and generates electronic signals including the degrees of pivot.

A rear connector bracket (not shown) is coupled to tugger frame 602 at a pivot point such that the rear connector bracket pivots relative to tugger frame 602 from side to side along a vertical axis. A rear sensor system (not shown) senses a degree that the rear connector bracket is pivoted relative to tugger frame 602 and generates electronic signals including the degrees of pivot. Front connection interface 616 and a rear connection interface (not shown) are electrically connected to the at least one motor, front sensor system 636, and the rear sensor system (not shown). First tugger cart 600 can further include the automated lift assemblies described above, as well as the sensors of the automated lift assemblies.

Second tugger cart 670 includes a second tugger frame 672 having a second front member 674, a second rear member 676, a second transverse member 678 connecting second front member 674 to second rear member 676. A central member 679 is disposed in between second front member 674 and second rear member 676. Central member 679 is coupled to second transverse member 678. First bay 672a is defined by second front member 674 and central member 679, and second bay 672b is defined by central member 679 and second rear member 676. A first platform 671a is coupled to second tugger frame 672 within first bay 672a and a second platform 671b is coupled to second tugger frame 672 within second bay 672b. First platform 671a and second platform 671b are each configured to secure a rider cart within first bay 672a and second bay 672b, respectively.

A second plurality of wheels 677 are operatively coupled to second tugger frame 672. At least one second motor (not shown) pivots second plurality of wheels 677 from side to side to steer second plurality of wheels 677 via a second tie rod 675. A second front connector bracket 673 is coupled to second tugger frame 672 at a pivot point such that second front connector bracket 673 pivots relative to second tugger frame 672 from side to side along a second vertical axis. A second front sensor system 680 senses a degree that second front connector bracket 673 is pivoted relative to second tugger frame 672 and generates electronic signals including the degrees of pivot.

A second rear connector bracket (not shown) is coupled to second tugger frame 672 at a pivot point such that the second rear connector bracket pivots relative to second tugger frame 672 from side to side along a vertical axis. A second rear sensor system (not shown) senses a degree that the second rear connector bracket is pivoted relative to second tugger frame 672 and generates electronic signals including the degrees of pivot. Second front connection interface 682 and a second rear connection interface (not shown) are electrically connected to the at least one second motor, second front sensor system 680, and the second rear sensor system. Second tugger cart 670 can further include the automated lift assemblies described above, as well as the sensors of the automated lift assemblies.

FIG. 6 further illustrates a hitch control 644 that can include a portion or all of the elements of the hitch control shown in FIG. 5. Hitch control 644 of FIG. 6 includes at least a controller (not shown), a user interface 648, a power button 654, a first activation button 656, and a second activation button 658.

To mechanically connect first tugger cart 600 and second tugger cart 670 together, the rear connector bracket of first tugger cart 600 is connected to second front connector bracket 673 of first tugger cart 600 by a connection link 685 or another connector mentioned above. To electrically connect first tugger cart 600 and second tugger cart 670 together, the rear connection interface of first tugger cart 600 is connected to second front connection interface 682 of second tugger cart 670 via an electrical cable, or wireless pairing and connection. As can be seen in FIG. 6, first tongue 660 of first tugger cart 600 is pivoted downward in a deployed position to connect with hitch control 644. Second tongue 683 of second tugger cart 670 is pivoted upward in a stowed position, as second tongue 683 is not in use for this particular train.

Hitch control 644 and tugger truck can be connected to either first tongue 660 or second tongue 683 of tugger train 600, 670. In the configuration shown in FIG. 6, hitch control 644 and tugger truck are connected to first tongue 660. As mentioned above, each tugger cart 600, 670 can include two sensor systems, including a front sensor system 636, 680 and a rear sensor system (not shown). In certain embodiments, only one sensor system for each tugger cart 600, 670 are utilized at a time. For example, the controller senses direction or motion of travel, that hitch control 644 is connected to front connection interface 616, that first tongue 660 is connected to hitch control 644, or a combination thereof. Then, front sensor systems 636, 680 are activated and the rear sensor systems are deactivated such that only front sensor systems 636, 680 are sending signals to controller. As such, the controller controls both motors of first tugger cart 600, and thereby controls the steering of plurality of wheels 614 of first tugger cart 600 based on signals from only front sensor system 636. The controller controls both motors of second tugger cart 670, and thereby controls the steering of second plurality of wheels 677 of second tugger cart 670 based on signals from only second front sensor system 680.

When hitch control 644 is connected to second tongue 683 and second rear connection interface of second tugger cart 670, controller senses the direction or motion of travel, the connection to second tongue 683, the connection to second rear connection interface, or a combination thereof. Front sensor systems 636, 680 are deactivated and the rear sensor systems are activated such that only rear sensor systems are sending signals to controller. As such, the controller controls both motors of first tugger cart 600 and thereby the steering of plurality of wheels 614 of first tugger cart 600 based on signals from the rear sensor system. The controller controls both motors of second tugger cart 670 to control the steering of second plurality of wheels 677 of second tugger cart 670 based on signals from second rear sensor system.

To power the train of tugger carts 600, 670, a user may press power button 654 of hitch control 644. The rider carts can then be loaded within bay 612, and first bay 672a and second bay 672b of first tugger cart 600 and second tugger cart 670, respectively. The user can roll the rider carts into bay 612, first bay 672a, and second bay 672b. The user or another user can press first activation button 656 of hitch control 644. Hitch control 644 is electrically connected to first tugger cart 600 and second tugger cart 670. Consequently, when first activation button 656 of hitch control 644 is pressed, each of the automated lift assemblies of each of first tugger cart 600 and second tugger cart 670 raise at the same time, and raise the rider carts to an elevated position. Alternatively, user interface 648 can be utilized to lift each pair of automated lift assemblies within each respective bay 612, 672a, 672b independent of one another. Further, the sensors of each pair of the automated lift assemblies can each send signals to hitch control 644. Controller of hitch control 644 processes the signals and controls the actuators to lift sliding frames at the same pace such that the rider carts are level while being raised by platforms 610, 671a, and 671b.

A tugger truck that is connected to hitch control 644 is used to drive tugger train 600, 670 around the industrial building. Once the rider carts are raised up and off the ground, the tugger truck can drive the train of tugger carts 600, 670 from a loading area to a drop-off area. As the tugger truck is driving, the controller of hitch control 644 receives electronic signals from sensor systems 636, 680. When the tugger truck steers to a different direction, front sensor system 636 of first tugger cart 600 begins to generate signals of the degree of pivot of front connecter bracket 620 relative to tugger frame 602, which indicates a degree of steering that is taking place. Front sensor system 636 sends the electronic signals that include the degree of steering to control hitch 644. The controller of control hitch 644 determines an optimal direction of steering, rate of steering, and degree of steering for plurality of wheels 614 for tugger cart 600, based on the signals. As the tugger truck continues to turn, second front sensor system 680 of second tugger cart 670 sense additional degrees of pivot of second connector bracket 673 and sends electronic signals. The controller can process these electronic signals to dynamically steer plurality of wheels 614 and second plurality of wheels 677 of first tugger cart 600 and second tugger cart 670, respectively.

Once the tugger train has reached the drop-off location, the tugger train stops and unloads the rider carts. To unload the rider carts from bay 612, and first bay 672a and second bay 672b of first tugger cart 600 and second tugger cart 670, respectively, a user can press second activation button 658 of hitch control 644. When second activation button 658 of hitch control 644 is pressed, each of the automated lift assemblies of first tugger cart 600 and second tugger cart 670 can lower at the same time, and lower the rider carts to the ground. Alternatively, user interface 648 can be utilized to lower each pair of automated lift assemblies within each respective bay 612, 672a, 672b independent of one another. The sensors of each pair of automated lift assemblies send signals to hitch control 644. Controller of hitch control 644 processes the signals and controls the actuators to lower the sliding frames within each bay 612, 672a, 672b, at the same pace such that the rider carts are level while being lowered by platforms 610, 671a, and 671b. A user can then roll the rider carts out of bay 612, first bay 672a, and second bay 672b and to a desired location.

The entire contents of all references cited in this disclosure are incorporated herein in their entireties, by reference. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether such a range is separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. A tugger cart system comprising:
   a tugger cart comprising
      a tugger frame having a front member, a rear member, a transverse member connecting the front member to the rear member, and at least one bay defined by the front member and the rear member, the at least one bay being dimensioned to receive a rider cart,
      at least one platform configured to secure a rider cart within the at least one bay of the tugger frame,
      a plurality of wheels operatively coupled to the tugger frame,
      at least one motor that pivots the plurality of wheels from side to side to steer the plurality of wheels,
      at least one connector bracket coupled to the tugger frame at a pivot point such that the at least one connector bracket pivots relative to the tugger frame from side to side along a vertical axis, the at least one connector bracket configured to attach the tugger frame to an adjacent tugger cart or tugger truck, and
      at least one sensor system that senses a degree that the at least one connector bracket is pivoted relative to the tugger frame and that generates an electronic signal comprising the degree of pivot; and
   a controller configured to receive an electronic signal from the at least one sensor system and control the at least one motor to steer the plurality of wheels based on the electronic signal.

2. The tugger cart system of claim 1, wherein the plurality of wheels comprises a front pair of wheels operatively coupled to the front member and a rear pair of wheels operatively coupled to the rear member.

3. The tugger cart system of claim 2, wherein the tugger cart further comprises a front tie rod operatively connected to the front pair of wheels and operatively connected to the at least one motor such that the at least one motor shifts the front tie rod to steer the front pair of wheels.

4. The tugger cart system of claim 3, wherein the tugger cart further comprises a rear tie rod operatively connected to the rear pair of wheels and operatively connected to the at least one motor such that the at least one motor shifts the rear tie rod to steer the rear pair of wheels.

5. The tugger cart system of claim 4, wherein the at least one motor comprises a front motor operatively connected to the front tie rod, and a rear motor operatively connected to the rear tie rod, wherein the front motor and the rear motor operate independently of one another.

6. The tugger cart system of claim 1, wherein the at least one sensor system comprises a transmitter and a receiver, wherein one of the transmitter and the receiver is coupled to the tugger frame and the other of the transmitter and the receiver is coupled to the at least one connector bracket.

7. The tugger cart system of claim 1, wherein the tugger frame further comprises a central member disposed in between the front member and the rear member, the central member is coupled to the transverse member, and the at least one bay comprises a first bay defined by the front member and the central member, and a second bay defined by the central member and the rear member.

8. The tugger cart system of claim 7, wherein the at least one platform comprises a first platform configured to secure a first rider cart within the first bay of the tugger frame, and a second platform configured to secure a second rider cart within the second bay of the tugger frame.

9. The tugger cart system of claim 1, wherein the controller determines a direction of steering, a rate of steering, and a degree of steering based on the electronic signal and controls the at least one motor to steer the plurality wheels at the determined direction of steering, the determined rate of steering, and the determined degree of steering.

10. The tugger cart system of claim 1, wherein the tugger cart further comprises at least one automated lift assembly coupled to the tugger frame, wherein the at least one automated lift assembly is configured to raise the platform relative to the tugger frame upon a first activation, and lower the platform relative to the tugger frame upon a second activation.

11. The tugger cart system of claim 10, wherein the at least one automated lift assembly comprises:
   an actuator comprising a piston configured to extend and retract in a horizontal direction;
   an actuator bracket coupled to the piston and configured to move with the piston in the horizontal direction;
   a sliding frame fixedly coupled to the at least one platform and slidably coupled to the tugger frame such that the sliding frame slides vertically relative to the tugger frame; and
   at least a first pair of link arms comprising a first link arm having a first end pivotably coupled to the tugger frame and a second end pivotably coupled to the actuator bracket, and a second link arm having a first end pivotably coupled to the sliding frame and a second end pivotably coupled to the actuator bracket, wherein when the at least one automated lift assembly is activated to raise the platform, the piston extends in the horizontal direction such that the actuator bracket pivots the first pair of link arms to an extended position that lifts the sliding frame relative to the tugger frame, and thereby lifts the platform to an elevated position, and when the at least one automated lift assembly is activated to lower the platform, the piston retracts in the horizontal direction such that the actuator bracket pivots the first pair of link arms to a retracted position that lowers the sliding frame relative to the tugger frame, and thereby lowers the platform from the elevated position.

12. The tugger cart system of claim 11, wherein the tugger cart further comprises a second pair of link arms comprising a third link arm having a first end pivotably coupled to the tugger frame and a second end pivotably coupled to the actuator bracket, and a fourth link arm having a first end pivotably coupled to the sliding frame and a second end pivotably coupled to the actuator bracket, wherein the second pair of link arms are coupled at an opposite end of the actuator bracket relative to the first pair of link arms.

13. The tugger cart system of claim 12, wherein the at least one automated lift assembly comprises a first automated lift assembly coupled to the front member and a second automated lift assembly coupled to the rear member.

14. The tugger cart system of claim 1, wherein the at least one connector bracket comprises a front connector bracket pivotably connected to the front member and a rear connector bracket pivotably connected to the rear member.

15. The tugger cart system of claim 14, wherein the at least one sensor system comprises a front sensor system that senses a degree that the front connector bracket pivots relative to the tugger frame and a rear sensor system that senses a degree that the rear connector bracket pivots relative to the tugger frame, wherein each of the front sensor system and the rear sensor system are configured to generate electronic signals that are received by the controller.

16. The tugger cart system of claim 1, wherein the tugger cart further comprises at least one tongue pivotably coupled to the connector bracket along a horizontal axis at a second pivot point, the at least one tongue pivots upward to be disposed in a vertical direction in a stowed position and pivots downward to be disposed in a horizontal direction in a deployed position where it is configured to connect with an adjacent tugger cart or tugger truck.

17. The tugger cart system of claim 1, wherein the tugger cart further comprises a front connection interface disposed at the front member and a rear connection interface disposed at the rear member, wherein the front connection interface and the rear connection interface are electrically connected to the at least one motor and the at least one sensor system, and the front connection interface and the rear connection interface are configured to electrically connect with the controller or another tugger cart.

18. The tugger cart system of claim 17, further comprising a hitch control comprising the controller, a user interface for the controller, and a hitch connection interface, the hitch connection interface configured to releasably connect with the front connection interface or the rear connection interface to communicate with the at least one motor and the at least one sensor system.

19. The tugger cart system of claim 1, further comprising a second tugger cart, the second tugger cart comprising
   a second tugger frame having a second front member, a second rear member, and a second transverse member connecting the second front member to the second rear member, wherein at least one second bay is defined by the second front member and the second rear member, the at least one second bay being dimensioned to receive a rider cart, at least one second platform configured to secure a rider cart within the at least one second bay of the second tugger frame, a second plurality of wheels operatively coupled to the second tugger frame, at least one second motor that pivots the second plurality of wheels from side to side to steer the second plurality of wheels, at least one second connector bracket coupled to the second tugger frame at a pivot point such that the at least one second connector bracket pivots relative to the second tugger frame from side to side along a second vertical axis, at least one second sensor system that senses a degree that the at least one second connector bracket is pivoted relative to the second tugger frame and generates a second electronic signal comprising the degree of pivot, and a second connection interface electrically connected to the at least one second motor and the at least one second sensor system, wherein the at least one second connector bracket of the second tugger cart is connected to the at least one connector bracket of the tugger cart by a connection link, the second connection interface of the second tugger cart is connected to a rear connection interface of the tugger cart, and the controller is configured to receive electronic signals from the at least one sensor system of the tugger cart and from the at least one second sensor system of the second tugger cart, and controls the at least one motor of the tugger cart and the at least one second motor of the second tugger cart, independently, to steer the plurality of wheels of the tugger cart and the second plurality of wheels of the second tugger cart, based on the electronic signals.

20. A tugger cart comprising:

a tugger frame having a front member, a rear member, a transverse member connecting the front member to the rear member, and at least one bay defined by the front member and the rear member, the at least one bay being dimensioned to receive a rider cart;

at least one platform configured to secure a rider cart within the at least one bay of the tugger frame;

a plurality of wheels operatively coupled to the tugger frame;

at least one motor that pivots the plurality of wheels from side to side to steer the plurality of wheels;

at least one connector bracket coupled to the tugger frame at a pivot point such that the at least one connector bracket pivots relative to the tugger frame from side to side along a vertical axis, the at least one connector bracket configured to attach to an adjacent tugger cart or tugger truck;

at least one sensor system that senses a degree that the at least one connector bracket is pivoted relative to the tugger frame and generates an electronic signal comprising the degree of pivot; and at least one connection interface electrically connected to the at least one motor and the at least one sensor system, wherein the connection interface is configured to releasably connect with a controller so that the at least one sensor system sends electronic signals to the controller and the controller controls the at least one motor based on the electronic signals.

* * * * *